(12) United States Patent
Vasudevan et al.

(10) Patent No.: US 9,193,884 B2
(45) Date of Patent: Nov. 24, 2015

(54) INK COMPOSITION

(75) Inventors: Sundar Vasudevan, Corvallis, OR (US);
Richard J. McManus, Corvallis, OR (US); Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/354,650

(22) PCT Filed: Dec. 22, 2011

(86) PCT No.: PCT/US2011/066788
§ 371 (c)(1),
(2), (4) Date: Apr. 28, 2014

(87) PCT Pub. No.: WO2013/095497
PCT Pub. Date: Jun. 27, 2013

(65) Prior Publication Data
US 2014/0285593 A1 Sep. 25, 2014

(51) Int. Cl.
| | | |
|---|---|---|
| *C09D 11/02* | (2014.01) | |
| *C09D 11/38* | (2014.01) | |
| *B41J 2/165* | (2006.01) | |
| *B41J 2/175* | (2006.01) | |
| *C09D 175/04* | (2006.01) | |

(52) U.S. Cl.
CPC ............... *C09D 11/38* (2013.01); *B41J 2/165* (2013.01); *B41J 2/17503* (2013.01); *C09D 175/04* (2013.01)

(58) Field of Classification Search
CPC .................................. C09D 11/30; C09D 11/38
See application file for complete search history.

(56) References Cited

U.S. PATENT DOCUMENTS

| | | |
|---|---|---|
| 5,472,490 A | 12/1995 | Sawamura et al. |
| 5,539,038 A | 7/1996 | Katsen et al. |
| 7,695,555 B2 | 4/2010 | Kabalnov et al. |
| 7,901,499 B2 | 3/2011 | Kitamura et al. |
| 2003/0052939 A1 | 3/2003 | Farr et al. |
| 2003/0060537 A1 | 3/2003 | Palazzo |
| 2007/0076068 A1 | 4/2007 | Guo et al. |
| 2009/0031922 A1 | 2/2009 | Rengaswamy et al. |
| 2009/0047484 A1 | 2/2009 | Kitamura et al. |

(Continued)

FOREIGN PATENT DOCUMENTS

| | | |
|---|---|---|
| JP | 2097576 | 4/1990 |
| WO | WO 96/10603 | 4/1996 |

(Continued)

OTHER PUBLICATIONS

Kanicky, J.R. et al., "Effect of Degree, Type, and Position of Unsaturation of the pKa of Long-Chain Fatty Acids," Journal of Colloid & Interface Science, 256, pp. 201-207 (2002).

(Continued)

*Primary Examiner* — Veronica F Faison
(74) *Attorney, Agent, or Firm* — Dierker & Associates, P.C.

(57) ABSTRACT

An ink composition includes a colorant, a co-solvent, and an acid chosen from oleic acid, linoleic acid, undecanoic acid, dodecanoic acid, tridecanoic acid, and combinations thereof. The ink composition further includes lithium and water. An anti-evaporative layer forms, during uncapped non-use, at an interface between air and the ink composition in an orifice of a nozzle, thereby reducing evaporation of the water from the ink composition.

15 Claims, 4 Drawing Sheets

(56) References Cited

U.S. PATENT DOCUMENTS

2010/0081740 A1 4/2010 Jackson
2011/0012954 A1 1/2011 Brown et al.
2011/0234695 A1 9/2011 Yamazaki et al.
2011/0236649 A1 9/2011 Nishiki et al.

FOREIGN PATENT DOCUMENTS

WO WO2009/079070 6/2009
WO WO 2011/115614 9/2011

OTHER PUBLICATIONS

European Search Report, Jun. 26, 2015, European Patent Application No. 11877906,5. 6 pages.

INK COMPOSITION

BACKGROUND

The present disclosure relates generally to ink compositions.

Inkjet printing or recording systems are commonly used as an effective way to produce images on a print medium, such as paper. Generally, ink droplets are ejected from a nozzle at high speed by the inkjet system and onto the print medium to produce an image thereon.

Upon prolonged exposure to air, nozzles may become clogged by a viscous plug that may form in the nozzles as a result of, e.g., water loss, crusting of the ink, and/or crystallization of the colorant in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
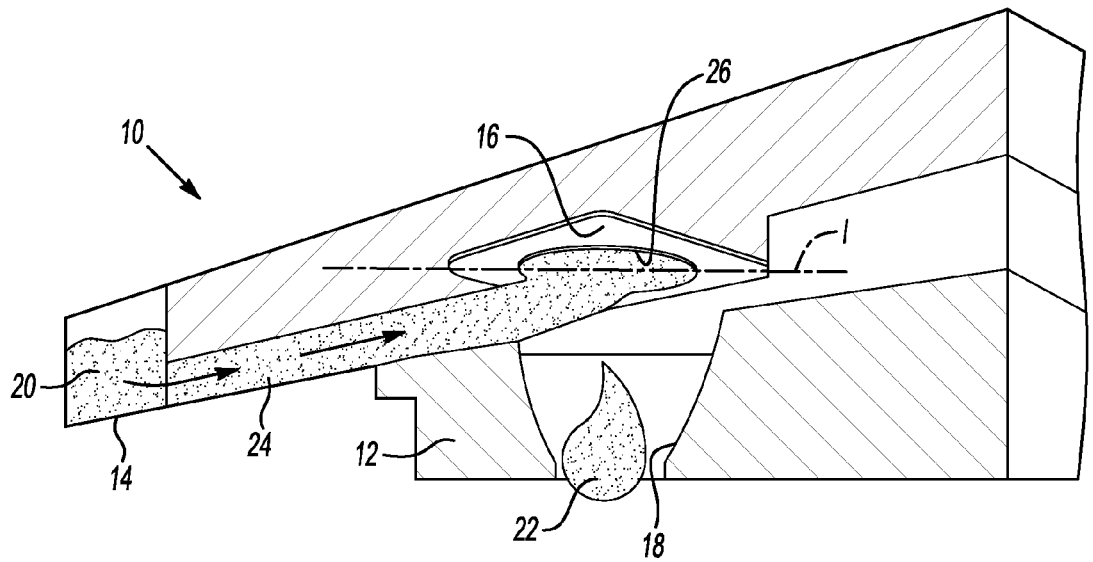
FIG. 1 is an enlarged, cutaway, cross sectional, perspective semi-schematic illustration of an example of a print cartridge including an example of the ink composition disclosed herein.

Examples of the ink composition disclosed herein exhibit desirable print reliability and decap performance (thereby maintaining good nozzle health).

The term "decap performance," as referred to herein, means the ability of the inkjet ink to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

Generally, as water evaporates from an ink formulation, the percentage of organic components in the ink increases. As the ink becomes more enriched in the organic co-solvents and other nonvolatile components, a colorant (e.g., a dispersed pigment) therein which is strongly hydrophilic is pulled back/retracted into the bulk of the aqueous phase.

Examples of the present disclosure control the degree/rate of pigment retraction in an efficient and cost-effective manner. Pigment retraction is referred to herein as "pigment ink vehicle separation" (PIVS).

As pigmented ink dries in an inkjet printhead, a rapid PIVS may take place (e.g., within about 1-4 seconds), which may result in the nozzles and/or the ink channel being substantially devoid of the colorant. As such, a rapid rate of PIVS is generally undesirable because of the idle (or decap) time being too short. To address PIVS, inkjet printers may force the printhead to spit onto a special absorbing pad/spittoon on a regular basis after a period of idle time (e.g., a predetermined number of spits per nozzle at a given frequency may maintain nozzle health of idle nozzles during printing). The rate of spitting is substantially controlled by the rate of PIVS. Very frequent spits are generally undesirable, because ink is consumed during spitting, and printing is slowed down.

In contrast, a slow rate of PIVS (e.g., from about greater than 4 seconds to about 60 seconds) is generally beneficial for the printhead functioning, for example, when the printhead is stored in an uncapped position, because it prevents the undesirable clogging of the nozzles or retraction of the colorant from the nozzle. Further, in some instances, it may be desirable for a print system to exhibit very slow PIVS (e.g., from greater than a minute to several hours).

Further, examples of the ink composition according to the present disclosure also provide improved decap performance for dye-based inks. In the case of both pigment-based and dye-based previously known inks, as water evaporates, a viscous plug may form at the nozzle in some instances. A subsequent ink drop would have to be fired through this viscous plug, and as such, the first few drops may not be ejected/ejected appropriately out of the orifice. Depending on the ink, successful ejection may occur after a couple of firing events. In contrast, examples of the ink composition of the present disclosure appear to prevent formation of this viscous plug (in pigment-based or dye-based inks), as well as controlling PIVS (in pigment-based inks).

Examples of the ink composition disclosed herein include components that provide excellent decap performance. Examples of the components include lithium, and an acid (e.g., a fatty acid surfactant) chosen from oleic acid (one cis double bond), linoleic acid (two cis double bonds), undecanoic acid, dodecanoic acid, tridecanoic acid, and combinations thereof.

The fatty acid surfactant has a carboxylate head and a long alkyl tail. It appears that the carboxylate group aids in contributing to good decap; for example, the inclusion of oleyl alcohol in the ink composition appears to contribute to poor decap performance. In addition, the alkyl tail has one or two cis double bonds. It has been discovered that the corresponding fully saturated fatty acids or those with trans double bonds generally do not provide the same benefit for enhancing decap performance according to the present disclosure. As such, examples of the ink composition of the present disclosure exclude acids chosen from stearic acid (a fully saturated fatty acid with 18 carbons), elaidic acid (the trans isomer of oleic acid), linolenic acid (three cis double bonds), linear (as opposed to branched) saturated fatty acids having a carbon chain of fewer than 11 carbons, and linear saturated fatty acids having a carbon chain of more than 13 carbons, and combinations thereof.

In an example, the chosen acid is dodecanoic acid (also known as lauric acid). Lauric acid has various benefits (that may be desirable in some instances) over oleic acid. For example, lauric acid is commercially available at greater purity (>99% versus 70%-80% for oleic acid). The lithium salt of lauric acid has a higher solubility than that of oleic acid. Since lauric acid has a lower molecular weight than oleic acid, less lauric acid is needed for the same number of moles. Both acids are derived from natural plant/animal sources and are equally inexpensive.

Examples of the ink composition according to the present disclosure further include a colorant (e.g., one or more colorants), a co-solvent (e.g., one or more co-solvents), and water.

The pH of examples of the ink composition generally ranges from about 7 to about 11. It may be desirable that the ink composition have a basic pH, ranging anywhere from greater than 7 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added will depend, at least in part, on the initial pH of the ink composition and the desired final pH of the ink composition. In an example, the pH is adjusted to about 9, and a suitable amount of base is added until this pH is obtained.

It is to be understood that the various components of examples of the ink composition may be present in any suitable amounts. In an example, the colorant is present in an amount ranging from about 2 wt % to about 7 wt % of the total wt % of the ink composition; the co-solvent is present in an amount ranging from about 10 wt % to about 30 wt % of the total wt % of the ink composition; the acid is present in an amount ranging from about 0.1 wt % to about 1.0 wt % of the total wt % of the ink composition; the lithium is present in an amount ranging from about 50 ppm to about 400 ppm; and a balance (up to 100 wt %) of the composition is water.

It has been unexpectedly and fortuitously found that examples of the ink composition of the present disclosure form an anti-evaporative layer during uncapped non-use at an interface between the air and the ink composition in an orifice of a nozzle, thereby reducing evaporation of the water from the ink composition. In examples of the present ink composition, the anti-evaporative layer is observed (with an optical microscope) forming by about 2 seconds of uncapped non-use. However, it is believed that formation of the layer begins sooner than 2 seconds of uncapped non-use.

It is to be understood that the lithium may be present in the composition as an ion in solution, or as a lithium salt of the acid. The lithium may be added to the ink composition in the form of a number of its salts, for example, lithium chloride, lithium bromide, lithium iodide, lithium hydroxide, lithium acetate, lithium benzoate, lithium nitrate, or combinations thereof. However, lithium carbonate is generally not desirable; as it appears to degrade decap performance in some instances.

Further, other alkali metals, e.g., sodium and potassium, may be present in examples of the ink composition. However, it is to be understood that the lithium aids in forming the anti-evaporative layer; whereas other alkali metals that may be present do not function to aid in formation of the anti-evaporative layer, nor do they hinder formation of the anti-evaporative layer.

It is to be understood that the colorant may be chosen from self-dispersed pigments, polymer dispersed pigments, dyes, and combinations thereof.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.). Any suitable dyes may be used in examples of the present ink composition.

Carbon blacks may be used as the colorant in examples of the present ink composition. For example, carbon blacks may be used that are of the lamp black, furnace black or gas black type. These carbon blacks may be made water dispersive: through oxidation, either through the carbon black process or through post carbon black manufacturing treatment (e.g., by ozonation); by reaction of the carbon black surface with either small molecule, oligomeric or polymeric materials that are water soluble or dispersive in nature (e.g., p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously mentioned acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups within the polymer such as carboxylates, sulfonates, phosphates or ethylene oxide derivatives.

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

The co-solvent may include suitable solvents, e.g., 2-pyrrolidinone; 1-(2-hydroxyethyl)-2-pyrrolidinone; diethyleneglycol, triethyleneglycol; tetraethylene glycol; 1-(2-hydroxyethyl)-2-imidazolidinone; di-(2-hydroxyethyl)-5,5-dimethylhydantoin (commercially available as Dantocol® DHE from Lonza, Inc., Allendale, N.J.); triethyleneglycol monoethyl ether; tetraglyme; glycerol polyoxyethyl ethers (e.g., ethoxylated glycerins, such as Liponic® EG-7 (LEG-7), commercially available from Lipo Chemicals, Inc., Paterson, N.J.); or combinations thereof.

Some examples of solvents that are not suitable as co-solvents for examples of the ink composition include 2-ethyl-2-hydroxymethyl-1,3-propanediol (EHPD) (also known as trimethylolpropane); and glycerol CAS #56-81-5.

Examples of the ink composition of the present disclosure may further include an additive chosen from non-ionic surfactants, biocides, polyurethane binders, acrylate polymer binders, and combinations thereof.

When a non-ionic surfactant is utilized, a suitable amount of the non-ionic surfactant may range from about 0.1 wt % to about 2 wt %. Examples of suitable non-ionic surfactants include those based upon acetylenic diol chemistry (e.g., SURFYNOL® SE-F, SURFYNOL® 104, SURFYNOL® 420, SURFYNOL® 440, SURFYNOL® 465, and SURFYNOL® 485, available from Air Products and Chemicals, Inc., Allentown, Pa.) and secondary alcohol ethoxylates (e.g., TERGITOL™ 15-S-7 and TERGITOL™ 15-S-9m available from The Dow Chemical Co., Midland, Mich.).

When a biocide is utilized, a suitable amount of the biocide may range from about 0.05 wt % to about 0.5 wt %. It is to be understood that the upper limit for the biocide(s) may depend upon the type of biocide and its toxicological effect and/or regulatory requirements. For example, the upper limit for PROXEL™ GXL (Arch Chemicals, Inc., Norwalk, Conn.) is 0.2 wt %. Suitable biocides include, for example, PROXEL™ GXL, KORDEK™ MLX (The Dow Chemical Co.), and/or BIOBAN™ CS-1246 (The Dow Chemical Co.).

Some suitable examples of the polyurethane binder include those having an acid number ranging from about 30 to about 90, and a molecular weight ranging from about 2000 to about 200,000. In an example, the polyurethane binder has an acid number of 55 and a molecular weight of about 18,000. It is to be understood that the co-solvent used and amount of co-solvent used may depend, at least in part, upon whether the polyurethane binder is included in the example of the ink composition. As an example, the co-solvent may be selected in order to aid in dispersing the polyurethane binder throughout the ink composition. As another example, the amount of polyurethane binder used may have a deleterious effect on the decap performance, and the co-solvent(s) may be selected to counteract this deleterious effect. In an example that includes the polyurethane binder, two co-solvents may be used, such as di-(2-hydroxyethyl)-5,5-dimethylhydantoin and 1-(2-hydroxyethyl)-2-pyrrolidinone.

Acrylate type polymers may also be used as an additive in examples of the present ink composition, though the co-solvent choice may differ from the choices for a polyurethane binder. Suitable acrylate polymers can consist of polymers having a molecular weight ranging from about 2000 to about 200,000, an acid number of from about 30 to about 180. Some examples of suitable monomers include acrylic acid, methacrylic acid, and esters of both acrylic acid and methacrylic acid.

Referring now to FIG. 1, a print cartridge is generally depicted at 10. The print cartridge 10 includes a housing 12 (which may include one or more layers of different materials) that is operatively connected to a reservoir 14 that contains an example of the ink composition 20 disclosed herein. A fluid path/ink channel 24 connects the reservoir 14 to a fluid ejector 16. In a thermal inkjet print cartridge, the fluid ejector 16 is a heating element that creates heat to vaporize the ink composition 20, which creates a bubble that expands to push the ink composition 20 (in the form of drops 22) out of an orifice 26 of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops 22 therefrom to produce images on a desirable medium.

As mentioned above, examples of the ink composition 20 form an anti-evaporative layer (shown at reference number 30 in FIGS. 7 and 9) during uncapped non-use at an interface I between air and the ink composition 20 in the orifice 26 of the nozzle 18, thereby reducing evaporation of the water from the ink composition 20.

Figure 2:
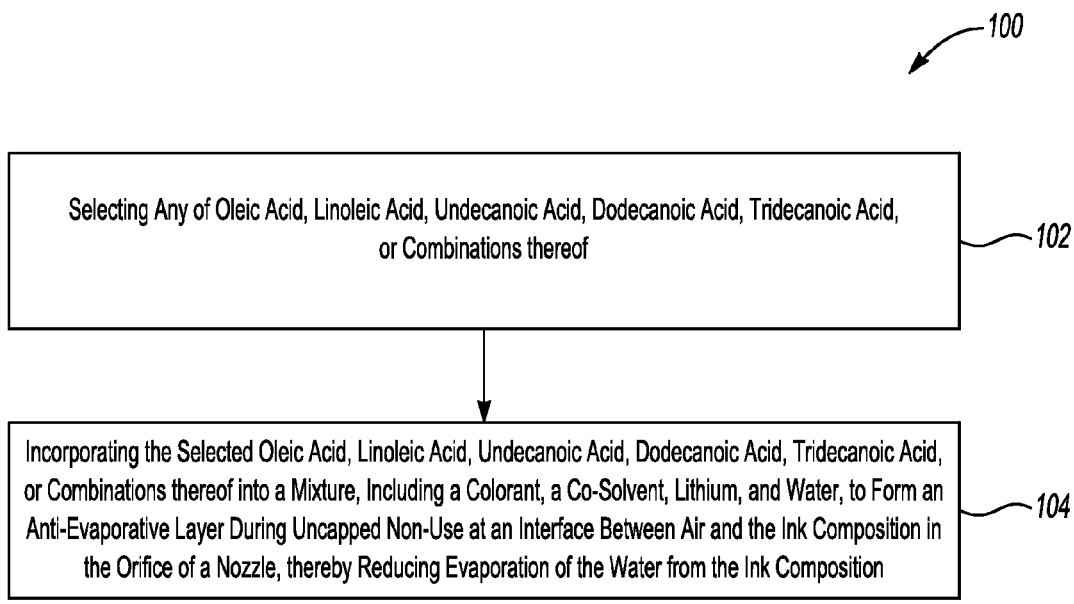
FIG. 2 is a flow diagram illustrating an example of a method according to an example of the present disclosure.

Referring now to FIG. 2, an example of a method for improving decap of an example of the ink composition according to the present disclosure is generally depicted at 100. The example of the method 100 includes selecting any of oleic acid, linoleic acid, undecanoic acid, dodecanoic acid, tridecanoic acid, or combinations thereof, as depicted at box 102. The method further includes incorporating the selected oleic acid, linoleic acid, undecanoic acid, dodecanoic acid, tridecanoic acid, or combinations thereof into a mixture, as depicted at box 104. The mixture includes a colorant, a co-solvent, lithium, and water. Examples of the ink composition form the anti-evaporative layer 30 during uncapped non-use, as noted above.

Examples of the ink composition of the present disclosure have been formulated that have good quality performance, while exhibiting a slow rate of PIVS (e.g., from about greater than 4 seconds to about 60 seconds). Other examples of the ink composition of the present disclosure have been formulated that have good quality performance, while exhibiting a very slow rate of PIVS (e.g., from about greater than 60 seconds to several hours). In an example of the present ink composition having anti-evaporative layer 30, satisfactory drop ejection was observed after about 24 hours of uncapped non-use.

To further illustrate the present disclosure, examples are given herein. It is to be understood that these examples are provided for illustrative purposes and are not to be construed as limiting the scope of the present disclosure.

EXAMPLE 1

Two inks were formulated containing the components as shown in Table 1 below, a comparative ink (Ink A) and an ink according to an example of the present disclosure (Ink B). For Ink B, lithium was added in the form of its hydroxide. The balance of each of the ink formulations was water.

TABLE 1

| Component (wt %) | Ink A (comparative) | Ink B |
|---|---|---|
| Self-dispersed carbon black pigment | 3 | 3.5 |
| Polyurethane binder | 0.7 | 0.7 |
| 2-Pyrrolidinone | 12.5 | 12.5 |
| Dantocol DHE | 9 | 9 |
| Oleic acid | 0.15 | 0.16 |
| Surfynol 465 | 0.2 | 0.2 |
| Proxel GXL | 0.2 | 0.2 |
| Lithium | None | 160 ppm |

Figure 3:
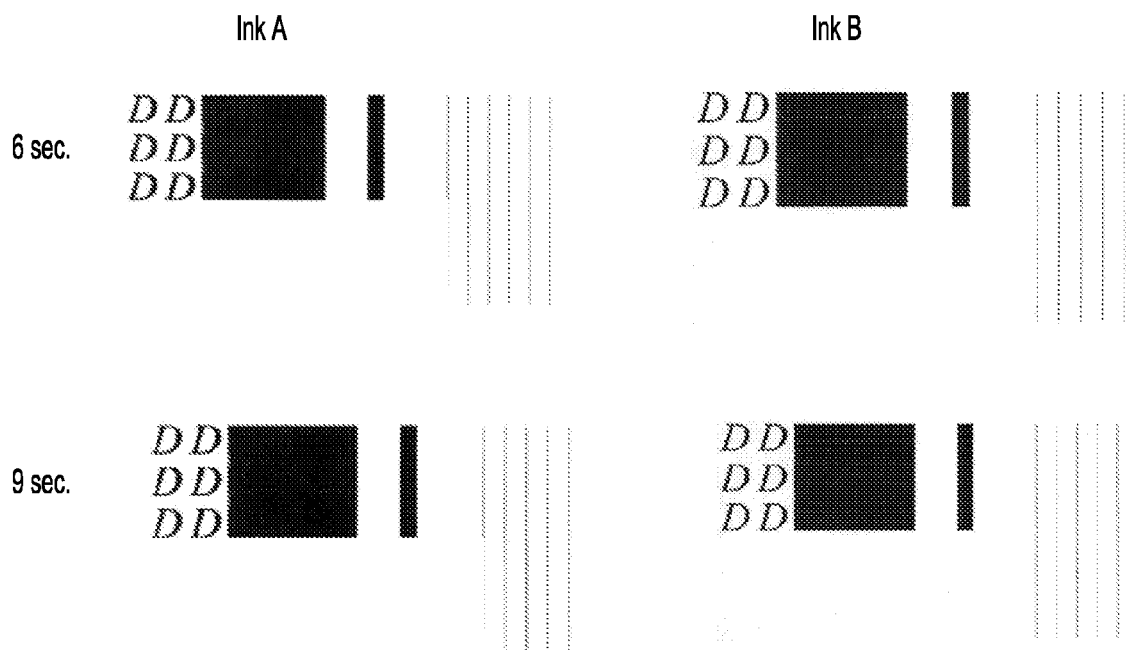
FIG. 3 illustrates decap plots of a comparative ink (Ink A) and an ink according to an example of the present disclosure (Ink B), at 6 second decap time and at 9 second decap time.
Figure 4:
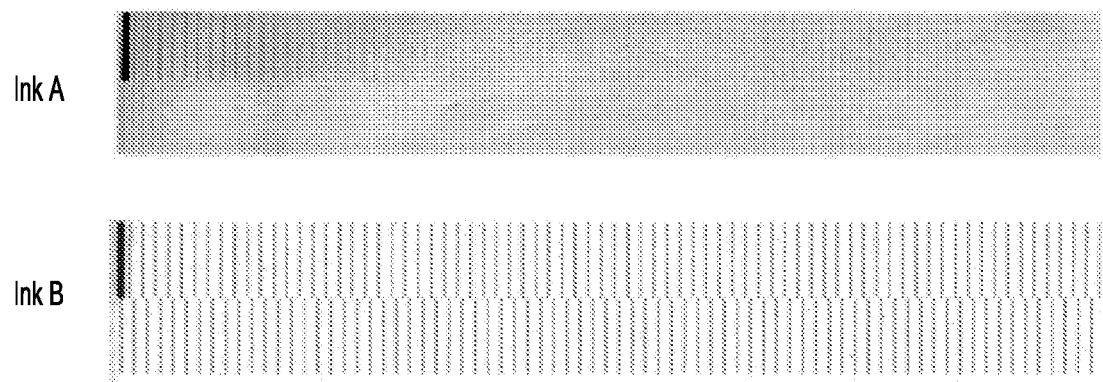
FIG. 4 illustrates spit on page (SoP) decap performance of Ink A and Ink B at 4 second decap time.

Two types of decap performance are evaluated for different print systems. Some print systems allow for spits off of the page to be printed into a receptacle ("traditional" decap). The other type spits drops (to maintain print health) on a page ("spit on page" (SoP)), and therefore should be limited in order to maintain print quality. Both are represented respectively in FIGS. 3 and 4. FIG. 3 illustrates decap plots of comparative ink (Ink A) on the left side of the Figure, and example ink (Ink B) on the right side of the Figure, at 6 second decap time (top) and at 9 second decap time (bottom). FIG. 4 illustrates spit on page (SoP) decap performance of Ink A (top) and Ink B (bottom) at 4 second decap time.

In FIG. 3, inks A and B were filled into HP 940 cartridges, and a nozzle check pattern was printed using an HP Officejet Pro 8000 series printer. The nozzle check pattern consists of letters, black areas, and short lines printed by individual nozzles in the printhead. The patterns for Inks A and B were evaluated for missing or misdirected lines indicating a problem with firing from a particular nozzle. For Ink A, 1 to 2 nozzles were missing or misdirected after 6 and 9 seconds; whereas for Ink B, it appeared that no nozzles were missing or misdirected after 6 and 9 seconds.

In FIG. 4, inks A and B were filled into HP 940 cartridges, and a nozzle check pattern was printed using an HP Officejet Pro 8000 series printer. Just prior to the beginning of the test, the nozzles were primed, and a nozzle check pattern was performed to ensure all nozzles were firing acceptably. During each scan across the page, the pen prints a pattern of 151 vertical lines (including the initial 0 second reference line) spaced about one sixteenth of an inch apart. Each vertical line was formed by all nozzles firing one drop. As such, each line is one drop wide and about one half inch high, corresponding to the length of the nozzle array on the printhead. The first vertical line in each scan is the first drop fired from each nozzle after no wait time, the second line is printed after 4 seconds of decap time, the third line was printed after an additional 4 seconds of decap time, and so forth for all 151 lines. As can be seen, comparative Ink A shows most of the nozzles missing or misfiring; whereas example Ink B appears to show all nozzles firing properly.

EXAMPLE 2

Figure 5:
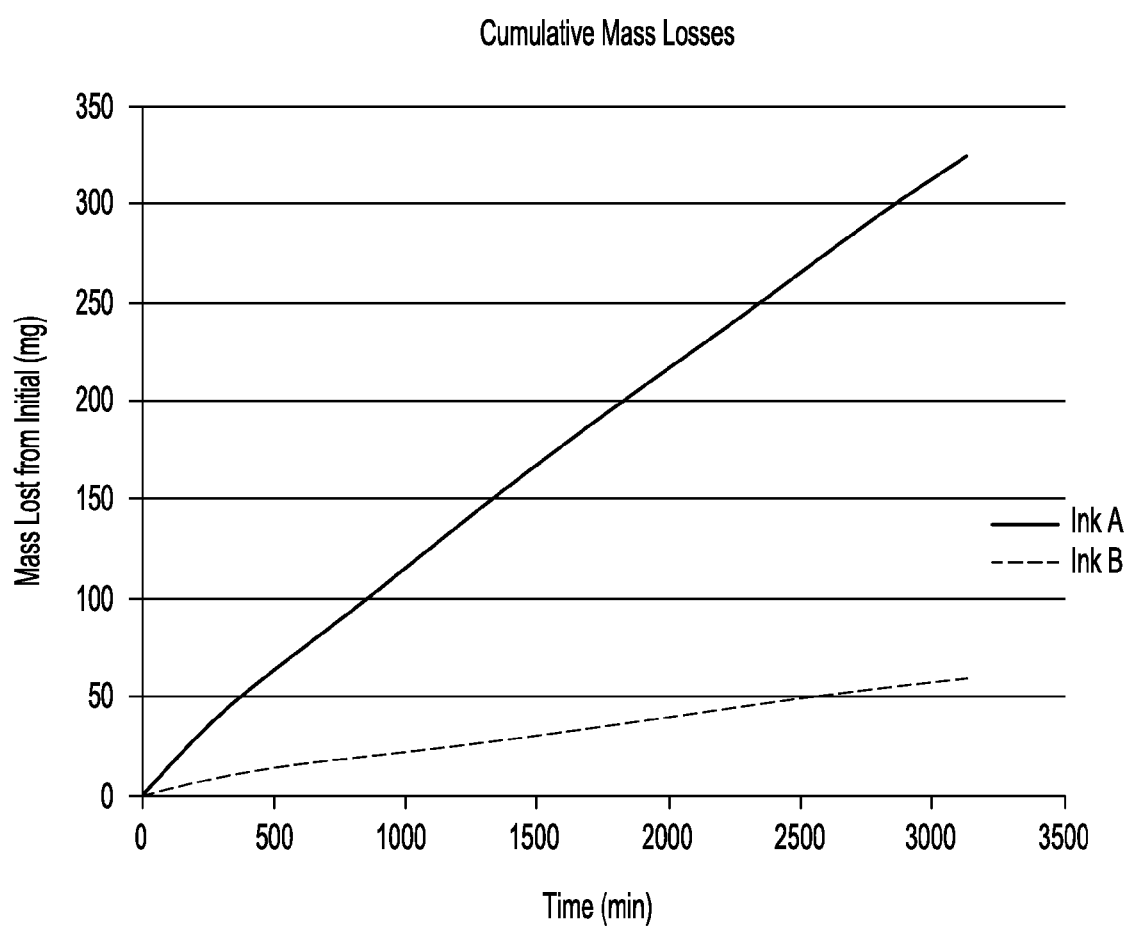
FIG. 5 is a graph depicting cumulative mass loss of Ink A and Ink B over time.

HP 88 pens were double filled with Ink A or Ink B (formulated according to Example 1), respectively, and were left uncapped and weighed over time. As can be seen in the graph shown in FIG. 5, the mass lost from example Ink B was much less than that lost from comparative Ink A.

Further, Ink B did not exhibit observable PIVS for over an hour.

EXAMPLE 3

Figure 6:
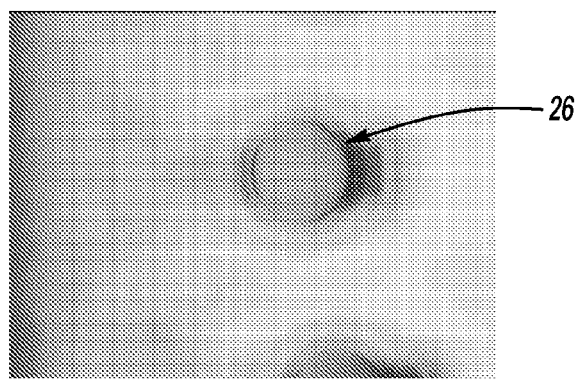
FIG. 6 is a 600× magnified image (using an optical microscope) of a nozzle orifice showing the colorant of Ink A retracting therefrom.
Figure 7:
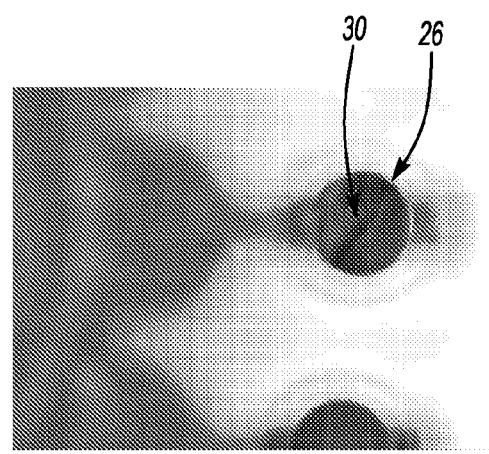
FIG. 7 is a 600× magnified image (using an optical microscope) of a nozzle orifice showing Ink B therein with an example of an anti-evaporative layer covering Ink B in the orifice.
Figure 8:
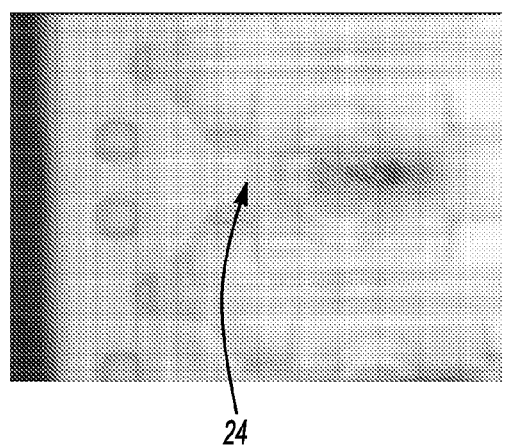
FIG. 8 is a 600× magnified image of an ink channel adjacent the nozzle orifice shown in FIG. 6, showing the colorant of Ink A retracting therefrom.
Figure 9:
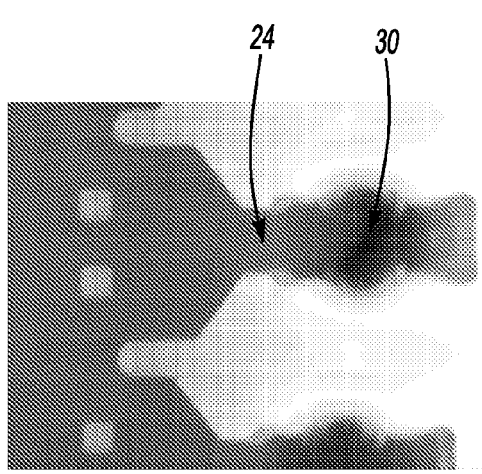
FIG. 9 is a 600× magnified image of an ink channel adjacent the nozzle orifice shown in FIG. 7, showing Ink B in the ink channel.

Inks A and B were filled respectively into HP 940 cartridges. For Ink A, FIGS. 6 and 8, these optical microscope images were taken about 10 minutes after wiping the nozzles to reset the ink, however visible PIVS formation can be seen within a few minutes by this technique. For Ink B, FIGS. 7 and 9, these optical microscope images were taken about 1.5 hours after wiping. The respective optical microscope images were taken of the nozzle orifices and the respective ink channel/path. As can be seen in FIGS. 6 and 8, comparative Ink A exhibited Pigment ink vehicle separation (PIVS), leading to colorant removed from the nozzle area to the bulk (reservoir) behind. However, as can be seen in FIGS. 7 and 9, a top layer (anti-evaporative layer 30) may be seen. Anti-evaporative layer 30 appears to prevent or largely slow down PIVS, as is evident from the black ink seen in the nozzle orifices, as well as in the respective ink channel/path.

EXAMPLE 4

An example of a magenta dye-based ink composition according to the present disclosure was formulated containing the components as shown in the two charts immediately below. In addition to the components shown below, oleic acid was added, as well as lithium (in the form of its hydroxide). The molar ratio was about 4 moles Li to about 1 mole oleic acid. The balance of the ink formulation was water. AR52 is an Acid Red dye, and M700 is a magenta dye.

| Components | Target (wt %) |
| --- | --- |
| 2-Pyrrolidone - 100% Active | 5.0 |
| 1,6-Hexanediol | 9.0 |
| 1-(2-Hydroxyethyl)-2-Pyrrolidone | 9.0 |
| Surfynol CT-111 | 0.16 |
| Dowfax 2A1 | 0.32 |
| Zonyl FSN | 0.50 |
| MOPS (3-(N-morpholino)propanesulfonic acid) Buffer | 0.10 |
| EDTA disodium salt | 0.0075 |
| Proxel GXL | 0.10 |

| Dye Component and Cation Form | Nominal Dye Load (wt %) |
| --- | --- |
| M700 (Na salt) | 2.78 |
| AR52 (Na salt) | 0.50 |

The example magenta ink composition did not appear to exhibit formation of a viscous plug at the nozzles after 12 seconds of uncapped non-use. Although not visually confirmed with this example composition, it appeared from test data that an anti-evaporative layer had begun to form by about 2 seconds of uncapped non-use. Successful ink drop ejection (good quality first drops) occurred without loss of/misdirection of nozzles for up to about 12 seconds in traditional decap tests; and for up to about ten minutes in the 4 second SoP decap test. It was concluded that examples of dye-based ink compositions according to the present disclosure exhibited the improved decap performance described herein.

Without being bound by theory, it is believed that the lithium salts of the fatty acids chosen from oleic acid, linoleic acid, undecanoic acid, dodecanoic acid, tridecanoic acid, and combinations thereof, form a monolayer or thicker layer at the air-water interface (as schematically shown at "I" in FIG. 1 and in the illustration immediately below), thereby greatly reducing water evaporation. This "soft" cap at the orifice 26, while acting as a protective layer, is nonetheless easily jetted out by the firing event. It has been shown that PIVS does not appear to happen with inks containing lithium salts of the above-mentioned fatty acids. It is further believed that the lithium ion (as opposed to other alkali metal ions) is the right size to act like a zipper to maintain the monolayer/layer of fatty acid at the air-water interface I. Sodium, potassium and other alkali metals appear to be too big to be effective in this manner.

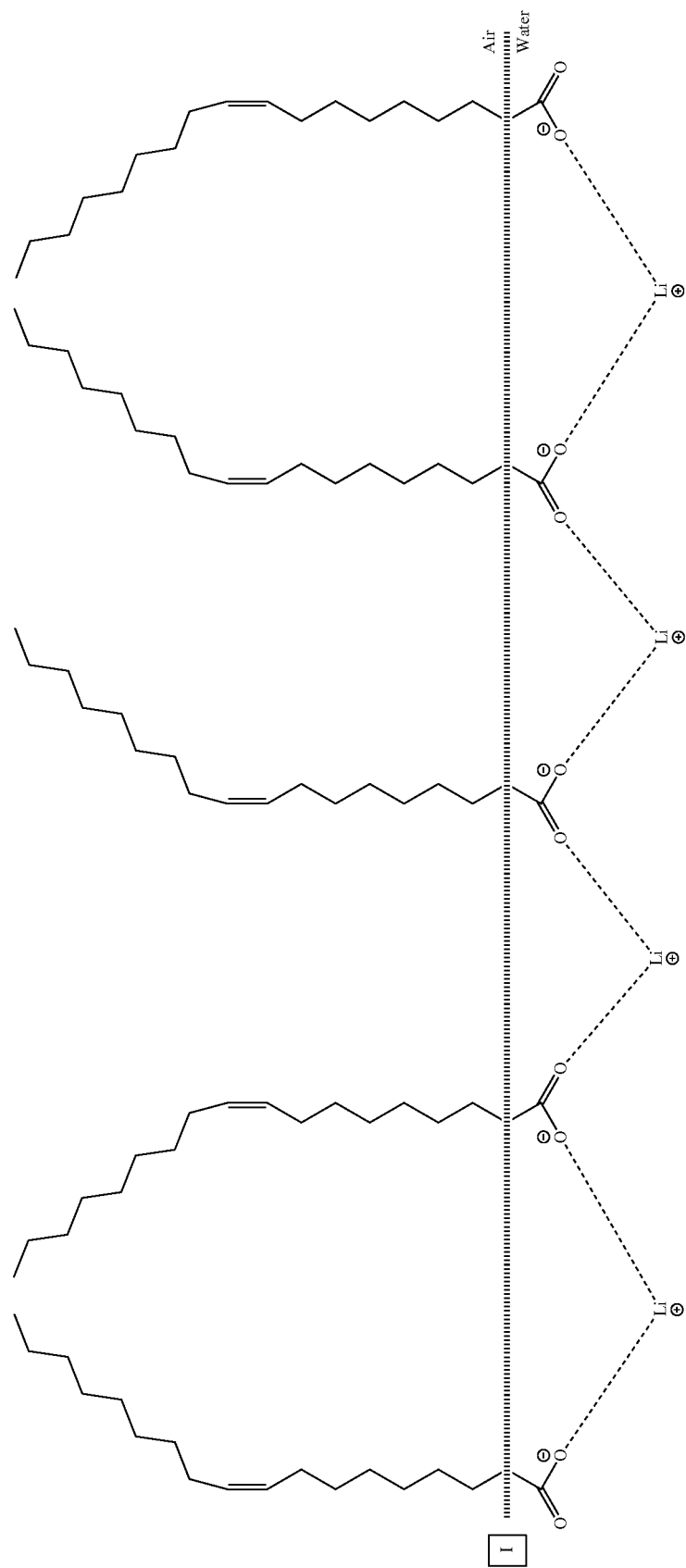

As can be seen in Table 2, differences in pKa of various fatty acids do not explain significant differences in decap performance. Lithium, if used with a non-suitable fatty acid (e.g., stearic acid, linolenic acid, etc.) does not provide good decap (lithium was the alkali metal used with the fatty acids tested with results shown in Table 2).

TABLE 2

| Acid | pKa | Decap |
| --- | --- | --- |
| Stearic | 10.15 | Bad |
| Elaidic | 9.95 | Bad |
| Oleic | 9.85 | Good |
| Linoleic | 9.24 | Good |
| Linolenic | 8.28 | Bad |

Possible Equilibrium

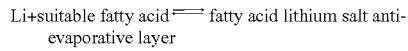

Li+suitable fatty acid ⇌ fatty acid lithium salt anti-evaporative layer

This equilibrium may be driven to the right, (favoring the anti-evaporative layer formation) with excess lithium, excess fatty acid, or both. The overall amount is generally dependent on the molecule, the solvent, the pigment amount, and polymer type and amount. Various examples of the present ink compositions have been prepared with ratios of Li to fatty acid of 4:1, 1:2 and 2:2, where 1 is equivalent to approximately $7.1 \times 10^{-3}$ molar concentration in the ink composition. The molar ratio for Ink B discussed above was 4 moles of lithium per mole of acid. Each of these examples exhibited excellent decap performance. For example, good quality first drops were achieved in traditional decap tests of several minutes; and additionally, in some examples, good quality drops were achieved up to about ten minutes in the 4 second SoP decap test. There does not appear to be an upper limit for this ratio, though at higher amounts of lithium added as hydroxide (or as a lithium salt of other anions), the pH may become too high.

It is yet further believed that the lithium cation coordinates with the adjacent carboxylate groups in the anti-evaporative layer when the limiting area is about 40-50 angstrom squared ($Å^2$). See Tables 3 and 4 below. Fatty acids with one or two cis double bonds have this limiting area; while those with three or more cis double bonds have larger limiting areas. The saturated and trans fatty acids have limiting areas much smaller than this. It is believed that stearic and elaidic acids may not work well because the nature of the alkyl tail allows for efficient packing that reduces solubility and/or prevents formation of an efficient layer across the ink air interface. Oleate and linoleate, on the other hand, have a suitable limiting area (or shadow area) to accommodate the lithium ion. Further, lithium stearate and elaidate have very poor solubility, which makes these fatty acid salts generally less desirable. Other alkali metal ions, e.g., sodium and potassium ions, are not as good as lithium in complexing carboxylates.

TABLE 3

| Acid | Limiting area ($Å^2$) | Limiting radius ($Å$) |
| --- | --- | --- |
| Stearic | 20 | 2.52 |
| Elaidic | 31-33 | 3.24 |
| Oleic | 41 | 3.61 |
| Linoleic | 48 | 3.91 |
| Linolenic | N/D | Too large |

TABLE 4

| Element | Radius of hydrated ion ($Å$) |
| --- | --- |
| Li | 3.40 |
| Na | 2.76 |
| K | 2.32 |

As illustrated with the structures below, lithium undecanoate (C11) and dodecanoate (C12) showed excellent decap. Tridecanoic acid (C13) also exhibited good decap, though not as good as that of the C11 and C12 linear saturated acids. Other chain lengths (aside from C11, C12 and C13) of linear saturated fatty acids do not provide decap benefit.

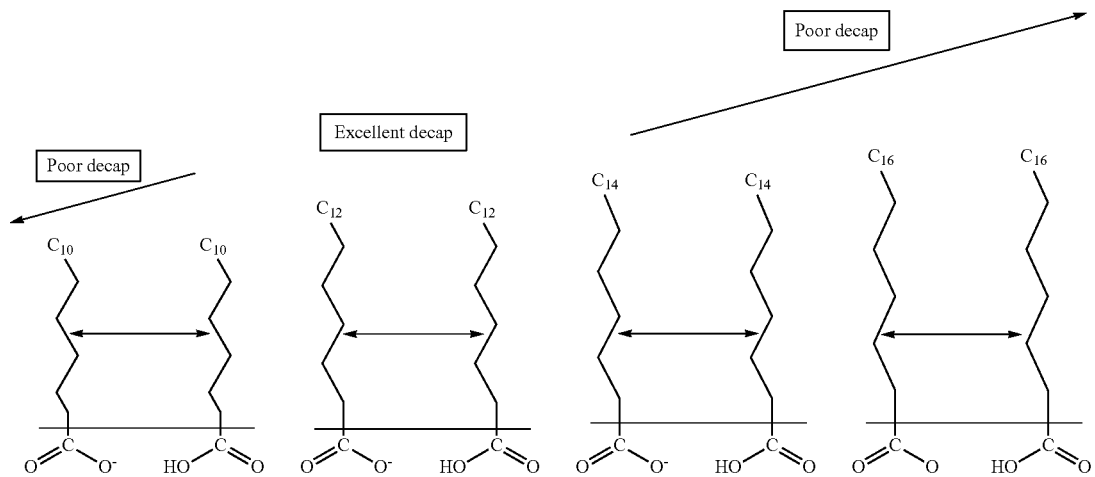

The anti-evaporative layer 30, formed by examples of the ink composition as disclosed herein, slows down evaporation from the nozzles, thus slowing or preventing pigment ink vehicle separation (PIVS) in a pigmented ink, or slowing or preventing evaporation of a dye-based ink. The anti-evaporative layer 30 also prevents an increase in viscosity of the ink in the firing chamber, thus preventing a viscous plug formation. This leads to good decap performance.

Examples of the ink composition of the present disclosure provide a simple, general and easily detected formulation for good decap of inkjet inks that greatly improves the quality of first-drop-out print performance. The exhibited decap performance improvement extends decap times to several minutes or more (as compared to a typical decap time of generally less than 4 seconds), thus enabling more efficient print systems and improved throughput. Examples of the present composition also work well with self-dispersed and polymer-dispersed pigment inks, as well as with dye-based inks.

It is to be understood that the ranges provided herein include the stated range and any value or sub-range within the stated range. For example, a range from about 10 wt % to about 30 wt % should be interpreted to include not only the explicitly recited limits of about 10 wt % to about 30 wt %, but also to include individual values, such as 12.5 wt %, 22 wt %, etc., and sub-ranges, such as from about 15 wt % to about 28 wt %, from about 11 wt % to about 13 wt %, etc. Furthermore, when "about" is utilized to describe a value, this is meant to encompass minor variations (up to +/−5%) from the stated value.

When molecular weights are specified herein, it is to be understood that the molecular weights are specified in Daltons (Da).

Further, it is to be understood use of the words "a" and "an" and other singular referents include plural as well, both in the specification and claims.

While several examples have been described in detail, it will be apparent to those skilled in the art that the disclosed examples may be modified. Therefore, the foregoing description is to be considered non-limiting.

What is claimed is:

1. An ink composition, comprising:
   a colorant;
   a co-solvent;
   an acid chosen from oleic acid, linoleic acid, undecanoic acid, dodecanoic acid, tridecanoic acid, and combinations thereof;
   from about 50 ppm to about 400 ppm of lithium; and
   water;
   wherein the ink composition is to form an anti-evaporative layer, during uncapped non-use, at an interface between air and the ink composition in an orifice of a nozzle, thereby reducing evaporation of the water from the ink composition.

2. The ink composition as defined in claim 1, excluding alkali metal salts to form the anti-evaporative layer, other than the lithium.

3. The ink composition as defined in claim 1, excluding acids chosen from stearic acid, elaidic acid, linolenic acid, linear saturated fatty acids having a carbon chain of fewer than 11 carbons, and linear saturated fatty acids having a carbon chain of more than 13 carbons, and combinations thereof.

4. The ink composition as defined in claim 1 wherein the chosen acid is dodecanoic acid.

5. The ink composition as defined in claim 1 a pH of the ink composition ranges from about 7 to about 11.

6. The ink composition as defined in claim 1 wherein the colorant is chosen from self-dispersed pigments, polymer dispersed pigments, dyes, and combinations thereof.

7. The ink composition as defined in claim 1 wherein the co-solvent includes 2-pyrrolidinone; 1-(2-hydroxyethyl)-2-pyrrolidinone; diethyleneglycol, triethyleneglycol; tetraethylene glycol; 1-(2-hydroxyethyl)-2-imidazolidinone; di-(2-hydroxyethyl)-5,5-dimethylhydantoin; triethyleneglycol monoethyl ether; tetraglyme; glycerol polyoxyethyl ethers; or combinations thereof.

8. The ink composition as defined in claim 1, further comprising an additive chosen from non-ionic surfactants, biocides, polyurethane binders, acrylate polymer binders, and combinations thereof.

9. The ink composition as defined in claim 1 wherein:
   the colorant is present in an amount ranging from about 2 wt % to about 7 wt %;
   the co-solvent is present in an amount ranging from about 10 wt % to about 30 wt %;
   the acid is present in an amount ranging from about 0.1 wt % to about 1.0 wt %;
   and
   a balance of the composition is the water.

10. A print cartridge, comprising:
    a fluid reservoir;
    a fluid ejector in fluid communication with the fluid reservoir;
    a nozzle in fluid communication with the fluid ejector;
    an ink composition present in the fluid reservoir, the ink composition including:
       from about 2 wt % to about 7 wt % of a colorant;
       from about 10 wt % to about 30 wt % of a co-solvent;
       from about 0.1 wt % to about 1.0 wt % of an acid chosen from oleic acid, linoleic acid, undecanoic acid, dodecanoic acid, tridecanoic acid, and combinations thereof;
       from about 50 ppm to about 400 ppm of lithium; and
       a balance of water; and
    an anti-evaporative layer present at an interface between air and the ink composition in an orifice of the nozzle, the anti-evaporative layer formed during uncapped non-use, thereby reducing evaporation of the water from the ink composition.

11. The print cartridge as defined in claim 10 wherein the ink composition excludes alkali metal salts to form the anti-evaporative layer, other than the lithium, and wherein the ink composition excludes acids chosen from stearic acid, elaidic acid, linolenic acid, linear saturated fatty acids having a carbon chain of fewer than 11 carbons, and linear saturated fatty acids having a carbon chain of more than 13 carbons, and combinations thereof.

12. The print cartridge as defined in claim 10 wherein:
    the colorant is chosen from self-dispersed pigments, polymer dispersed pigments, dyes, and combinations thereof; and
    the co-solvent is chosen from 2-pyrrolidinone; 1-(2-hydroxyethyl)-2-pyrrolidinone; diethyleneglycol, triethyleneglycol; tetraethylene glycol; 1-(2-hydroxyethyl)-2-imidazolidinone; di-(2-hydroxyethyl)-5,5-dimethylhydantoin; triethyleneglycol monoethyl ether; tetraglyme; glycerol polyoxyethyl ethers; and combinations thereof.

13. The print cartridge as defined in claim 10 wherein the ink composition further includes an additive chosen from non-ionic surfactants, biocides, polyurethane binders, acrylate polymer binders, and combinations thereof.

14. A method for improving decap of an ink composition, the method comprising:
    selecting any of oleic acid, linoleic acid, undecanoic acid, dodecanoic acid, tridecanoic acid, or combinations thereof; and
    incorporating the selected oleic acid, linoleic acid, undecanoic acid, dodecanoic acid, tridecanoic acid, or combinations thereof into a mixture, including:
       a colorant;
       a co-solvent;
       from about 50 ppm to about 400 ppm of lithium; and
       water;

wherein the ink composition is to form an anti-evaporative layer, during uncapped non-use, at an interface between air and the ink composition in an orifice of a nozzle, thereby reducing evaporation of the water from the ink composition.

15. The method as defined in claim 14 wherein the oleic acid, linoleic acid, undecanoic acid, dodecanoic acid, tridecanoic acid, or combinations thereof is selected instead of acids chosen from stearic acid, elaidic acid, linolenic acid, linear saturated fatty acids having a carbon chain of fewer than 11 carbons, and linear saturated fatty acids having a carbon chain of more than 13 carbons, and combinations thereof; and wherein the oleic acid, linoleic acid, undecanoic acid, dodecanoic acid, tridecanoic acid, or combinations thereof is incorporated in an amount ranging from about 0.1 wt % to about 1.0 wt %.

\* \* \* \* \*